United States Patent
Blum et al.

[19]

[11] Patent Number: 5,805,164

[45] Date of Patent: *Sep. 8, 1998

[54] DATA DISPLAY AND ENTRY USING A LIMITED-AREA DISPLAY PANEL

[75] Inventors: Jeffrey R. Blum; Sarah E. Zuberec, both of Seattle, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 639,636

[22] Filed: Apr. 29, 1996

[51] Int. Cl.⁶ .................................................. C06F 3/14
[52] U.S. Cl. ........................................ 345/347; 345/340
[58] Field of Search ............................ 395/347, 340, 395/339, 326, 352, 353, 346, 800.01; 345/347, 326, 354, 328, 327, 339, 340, 341, 357, 342, 343, 344, 352, 353, 345, 346

[56] References Cited

U.S. PATENT DOCUMENTS

| | | | |
|---|---|---|---|
| 5,247,611 | 9/1993 | Norden-Paul et al. | 395/340 |
| 5,546,521 | 8/1996 | Martinez | 395/340 |
| 5,563,997 | 10/1996 | Fisher | 395/347 |
| 5,568,451 | 10/1996 | Fukutomi | 368/10 |
| 5,602,997 | 2/1997 | Carpenter et al. | 395/349 |
| 5,606,712 | 2/1997 | Hidaka | 395/800 |
| 5,640,577 | 6/1997 | Scharmer | 395/768 |

OTHER PUBLICATIONS

Cary N. Prague and Michael R. Irwin, *Access For Windows 95 Bible, Third Edition,* (IDG Books Worldwide, Inc., 1995), pp. 471–475.

*Primary Examiner*—Raymond J. Bayerl
*Assistant Examiner*—Steve Sax
*Attorney, Agent, or Firm*—Lee & Hayes, PLLC

[57] ABSTRACT

A user interface utilizes a variable or changeable displayed field label and an associated data entry field for displaying and entering stored database properties. A pop-up list box is associated with the displayed field label, to be selectively displayed in response to a user's selection. When displayed, the pop-up list box contains a list of available field labels that can be alternatively selected by the user as the displayed field label. Each of the field labels corresponds to a different stored property. The data entry field corresponding to the displayed field label can be selected and used to enter a value for the stored property corresponding to the displayed field label. The pop-up list box contains an indication of any existing values for the stored properties corresponding to the available field labels. This indication clarifies to the user that the available field labels correspond respectively to different stored properties, rather than being alternative labels corresponding to a single stored property.

12 Claims, 4 Drawing Sheets

| | | |
|---|---|---|
| <NAME> | WORK TEL | <555-1111> |
| <TITLE> | WORK FAX | <555-2222> |
| <DEPARTMENT> | PAGER | <555-3333> |
| <COMPANY> | <OTHER> ☑ | <...> |
| <ADDRESS> | <CAR TEL> ☑ | <555-4444> |

Fig 1 Prior Art

| | | |
|---|---|---|
| <NAME> | WORK TEL | <555-1111> |
| <TITLE> | HOME TEL | <555-2222> |
| <DEPARTMENT> | WORK TEL | <555-3333> |
| <COMPANY> | INTERNET | <...> |
| <ADDRESS> | CAR TEL ☑ | <555-4444> |

Fig 2 Prior Art

| | | |
|---|---|---|
| <NAME> | WORK TEL | <555-1111> |
| <TITLE> | WORK FAX | <555-2222> |
| <DEPARTMENT> | PAGER | <555-3333> |
| <COMPANY> | <OTHER> ☑ | <...> |
| <ADDRESS> | <HOME TEL> ☑ | <...> |

Fig 3 Prior Art

DATA DISPLAY AND ENTRY USING A LIMITED-AREA DISPLAY PANEL

TECHNICAL FIELD

This invention relates to user interfaces for portable or handheld computing devices having limited display areas.

BACKGROUND OF THE INVENTION

Hand-held electronic organizers or PDAs (personal digital assistants) are becoming popular as replacements for paper-based organizers and appointment books. These devices are designed to be pocketable and easily accessible so that users feel comfortable taking them anywhere. They typically have miniature QWERTY keyboards and small user displays.

Most electronic organizers include a variety of application programs such as address book, calendar, and task management application programs. While the computing capabilities of typical organizers are sufficient to implement fairly complex application programs, the small display screens present challenges and problems in designing convenient and effective user interfaces.

FIG. 1 shows a portion of a user interface 29 that might be implemented by an address book program. Such a program typically maintains a plurality of records, corresponding respectively to different persons or businesses. Each record comprises a plurality of individual properties, such as first, middle, and last names, telephone numbers, address components, etc.

The user interface of FIG. 1 includes three different types of field labels. Each field label is associated with a data entry field. The field label referenced by numeral 30 is of a type that initially occupies its associated data entry field. This type of field label is referred to herein as a "temporary" field label. The user can select the temporary field label and overwrite it with data. After data entry, the field label is no longer displayed. This type of field label is appropriate when a field type can be fairly easily identified by its data or by the location of the field in relation to other fields.

The type of field label referenced by numeral 31 is positioned adjacent an associated data entry field 32 both before and after data is entered into the data entry field. This type of label, referred to herein as a "permanent" field label, is appropriate when data must be identified at all times by a label for the data to be meaningful.

The field label referenced by numeral 33 is referred to herein as a "variable" field label. It can be changed by a user. It is associated with a data entry field 34. Like permanent field label 31, variable field label 33 remains visible both before and after data entry. However, a control 35 is positioned adjacent the field label to allow a user to change it. Selecting the control or any part of the field label (for instance by touching it with stylus 43) activates or opens a pop-up list box 36 as shown in FIG. 2, containing a listing or menu of possible or available field labels. Pop-up boxes or controls such as these can be easily implemented in graphical operating system environments, where they are also referred to as combo boxes or drop-down boxes. The user can select one of the available field labels, whereupon the pop-up list box closes, as shown in FIG. 3, and the selected field label is displayed in the original location referenced by numeral 33. The field label actually selected and displayed on the user display is referred to herein as the "displayed" field label.

A variable field label can be used when there is a limited display area. It is possible to use a single data entry field, associated with a variable field label, for displaying and entering data relating to a plurality of individual properties. The user can select which property occupies such a data entry field at any particular time by selecting from the available field labels in the pop-up list associated with the variable field label.

Unfortunately, user tests have shown that such a data display and entry scheme sometimes confuses users. This is because users often think that changing a variable field label will change only the label applied to a particular property—rather than the property associated with the data entry field. In the sequence of FIGS. 1, 2, and 3, for instance, field label 33 initially reads "Car Tel," indicating that the corresponding data entry field 34 represents someone's car telephone number. When a user changes the field label to "Home Tel," the data previously entered for the "Car Tel" disappears from data entry field 34 because that data entry field is no longer used to represent the "Car Tel" property. Rather, it is now used to represent the "Home Tel" property, which initially contains no data. Although the data for "Car Tel" is still being stored, the user often does not understand this, and might believe that the previously entered data has been lost. Simply stated, the user often expects that the data in data entry field 34 will remain the same regardless of the field label chosen.

This can seriously undermine the confidence of users. To meet the needs of the widest ranges of consumers, a user interface in a PDA should avoid any source of possible confusion while still allowing efficient and intuitive data display and entry.

The invention described below reduces or eliminates the potential confusion resulting from the variable labeling scheme described above. This is accomplished without distracting display elements. The invention results in a user interface with greater clarity and usefulness than variable data field labeling schemes used in the prior art.

SUMMARY OF THE INVENTION

The invention allows a single data entry field to be used to display and accept data entry for a selected one of a plurality of properties. The data entry field is associated with a variable field label. The variable field label is associated with a pop-up list box containing a list of available field labels from which the user can select. In addition, each of the available field labels is followed by any existing data that has been entered for the corresponding property. This clarifies to the user that data is being stored for each of the field labels shown in the pop-up list box.

BRIEF DESCRIPTION OF THE DRAWINGS

FIGS. 1–3 illustrate the operation of a prior art data display and entry interface.

DETAILED DESCRIPTION OF THE PREFERRED EMBODIMENT

Figure 4:
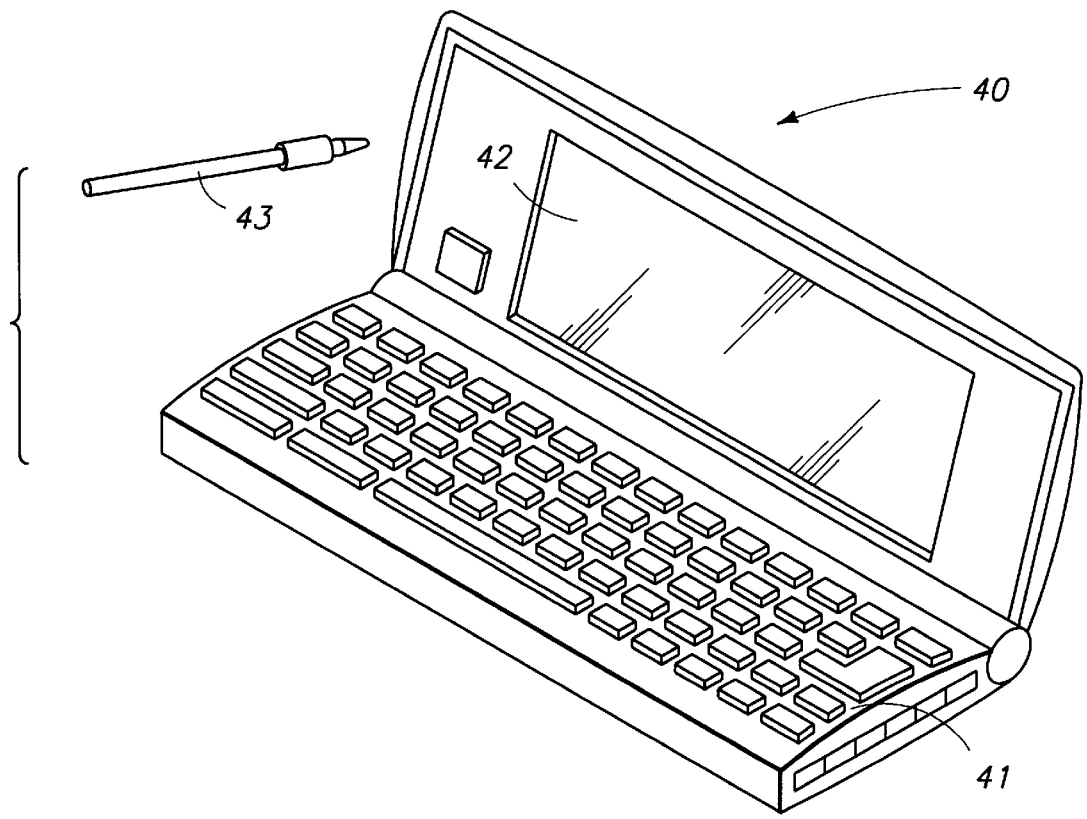
FIG. 4 shows a portable data entry device or electronic organizer accordance with the invention.

FIG. 4 shows a hand-held electronic organizer, PDA (personal digital assistant), or other portable data entry device, generally designated by reference numeral 40. Organizer 40 has a miniature QWERTY keyboard 41 and a user display 42 comprising a small LCD screen or panel. The screen is preferably a touch-sensitive screen for use with a stylus 43. It has a preferred minimum resolution of 480×240 pixels. In the preferred embodiment, the user display is a bit-mapped or pixel-addressable display, allowing the display of both text and graphics.

Figure 5:
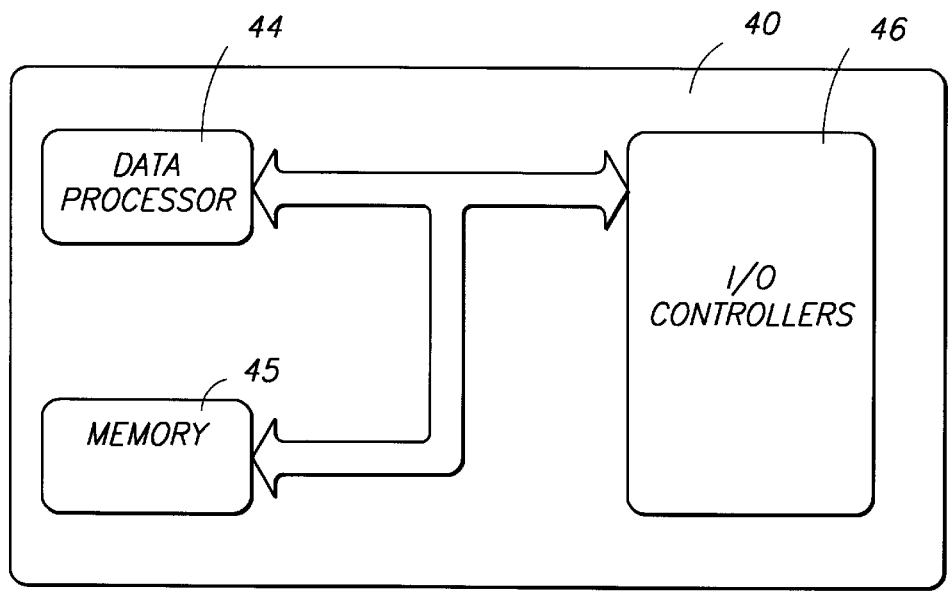
FIG. 5 is a simplified block diagram of the electronic organizer of FIG. 4.

As shown in the block diagram of FIG. 5, organizer 40 has a data processor 44, memory 45, and I/O controllers 46 that are operatively connected to interact with the various hardware elements of the PDA such as keyboard 41. LCD screen 42 is also responsive to data processor 44 through I/O controllers 46. Memory 45 includes battery-backed, randomly-addressable, read/write memory (RAM) for data storage, and read-only memory (ROM) containing an operating system and pre-installed application programs.

PDA 40 includes in its standard configuration a variety of application programs designed for execution by data processor 44. For instance, PDA 40 has address book, calendar, and task management application programs. These application programs operate under a graphical operating system similar to the Windows 95® operating system, produced by Microsoft Corporation of Redmond, Wash. The application programs use the graphical user interface features of the operating system to provide a familiar environment for users that might already be familiar with the Windows 95® operating system in a desktop environment.

The invention is described below in conjunction with an address book program running from memory 45 on data processor 44, although the invention is also useful in other data display and entry contexts where display areas are limited.

The read/write memory of electronic organizer 40 is accessible by data processor 44 for storing and retrieving data records such as an address book application program might maintain for different persons. Each record includes a plurality of individual stored properties. For instance, an address book record might include name, address, and telephone number properties. Each record potentially has more properties than can be meaningfully displayed simultaneously on LCD screen 42. In other words, the LCD screen has a display area that is too small to simultaneously display all the individual properties of a data record in a way that is easily understandable by a user.

Figure 6:
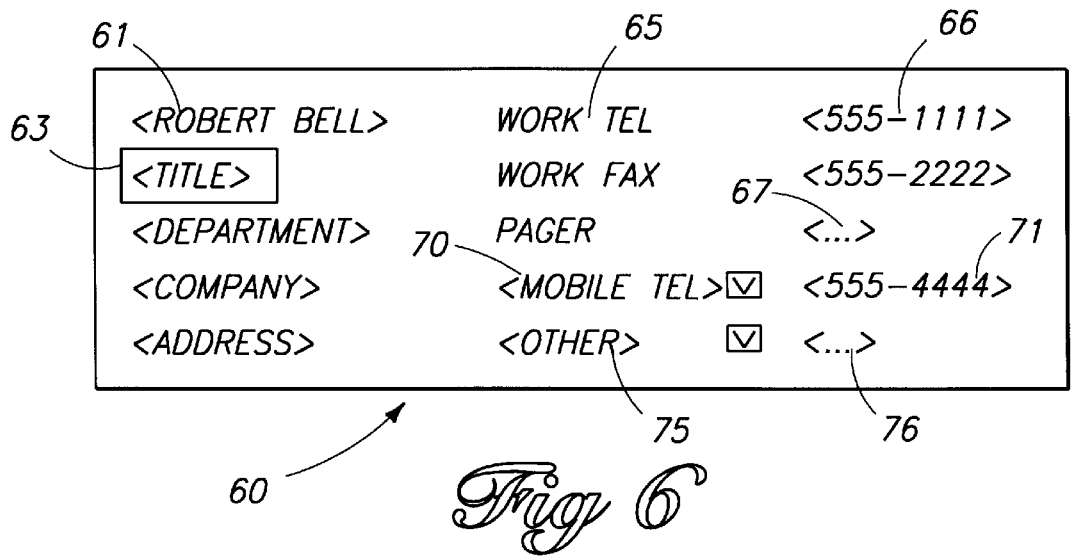
FIGS. 6–9 show the operation of a data display and entry interface as implemented in accordance with the invention on the electronic organizer of FIG. 4.

FIG. 6 shows a portion of preferred user interface 60 that might be used for data display and entry in an address book program on a device such as electronic organizer 40 that has a limited display area. User interface 60 comprises three different types of fields labels as discussed above in the Background section of this disclosure. The first type of field label, referred to herein as a "temporary" field label, is indicated by reference numeral 61. This type of field label initially occupies the same display area that forms the data entry field corresponding to the field label. When data is entered in the data entry field, the field label is removed. For instance, the data entry field designated in FIG. 6 by reference numeral 61 initially contained a field label reading "Name". Once actual data (in this case the name "Robert Bell") was entered into the data entry field, however, the field label disappeared and was replaced by the data. The field name would reappear if the data were to be subsequently deleted from the data entry field for the particular record being displayed.

To enter data corresponding to a temporary field label, the field label is first selected by a user. The user selects a field label by touching it with a stylus, clicking on it with a mouse, or by moving a cursor to it with keyboard controls. The field label indicated by reference numeral 63 has been selected by a user. When selected, the entire field label is highlighted (indicated by a box for purposes of illustration). In contrast to prior art user interfaces of this nature, the entire field name remains visible until the user actually begins data entry. When the user presses the first data entry key, the entire field label disappears and is replaced by whatever data is being entered.

An example of a second type of field label, referred to herein as a "permanent" field label, is indicated in FIG. 6 by reference numeral 65. A permanent field label is permanently displayed and is permanently associated with a separate data entry field. Field label 65 is associated with an adjacent data entry field 66. To enter data corresponding to a particular field label, the user selects the adjacent data entry field and simply begins entering data. The data entry field initially contains some sort of indication that it is empty, such as the ellipsis referenced by numeral 67 of FIG. 6. The ellipsis is deleted from the data entry field when data is entered into the field.

Two examples of the third type of field label are referenced by numerals 70 and 75 in FIG. 6. This type of field label is referred to herein as a "variable" field label. It is very similar to a permanent field label, in that it is associated with an adjacent data entry field, in this case with data entry fields 71 and 76, respectively. The data entry field is selectable by the user to enter a value for the stored data field or property corresponding to the variable field label. A field label such as field label 70 is not replaced by entered data. The data is entered on a separate data entry field.

Figure 7:
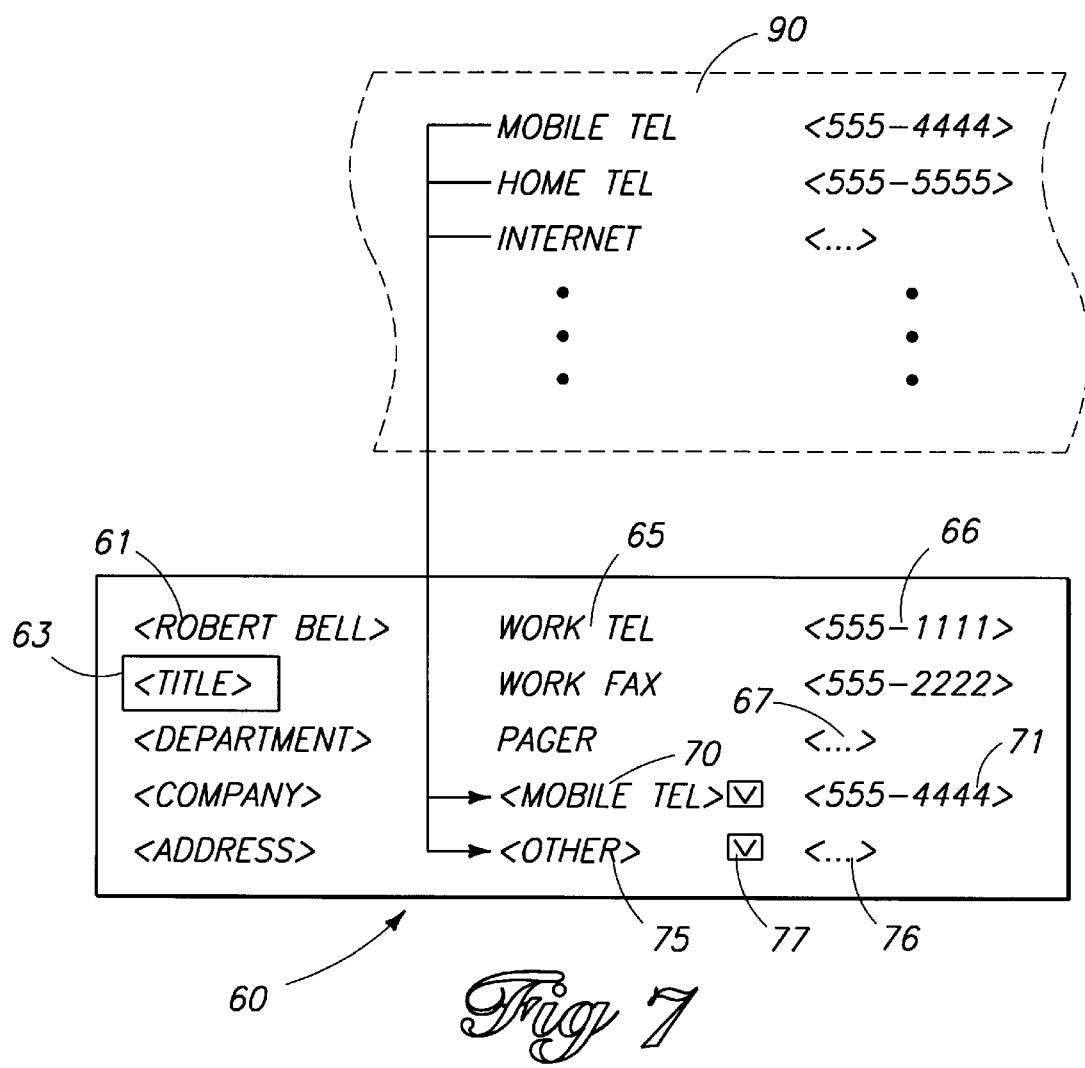

A variable field label differs from a permanent field label in that it can be changed by the user. In FIG. 6, field label 70 has been set to read "Mobile Tel". Corresponding data has been entered in associated data entry field 71. The user, however, can change field label 70 to text that corresponds to a different record property. This is illustrated in FIG. 7, which symbolically shows a portion of a database record 90. The database record contains a plurality of fields, each referenced by a field label shown in the first column of the record. Each field also potentially contains data, shown in the second column of the record. The first field, for example, has a field label "Mobile Tel" and corresponding data "555-4444". Fields which do not yet contain data, such as the "Internet" field, are indicated by an ellipsis in the second column.

The portion of database record 90 is not displayed as illustrated in FIG. 7 to the user. Rather, a user is able to select any of these field labels as one of variable field labels 70 or 75. When a particular field label is chosen, the associated data appears in data entry field 71 or 76.

Figure 8:
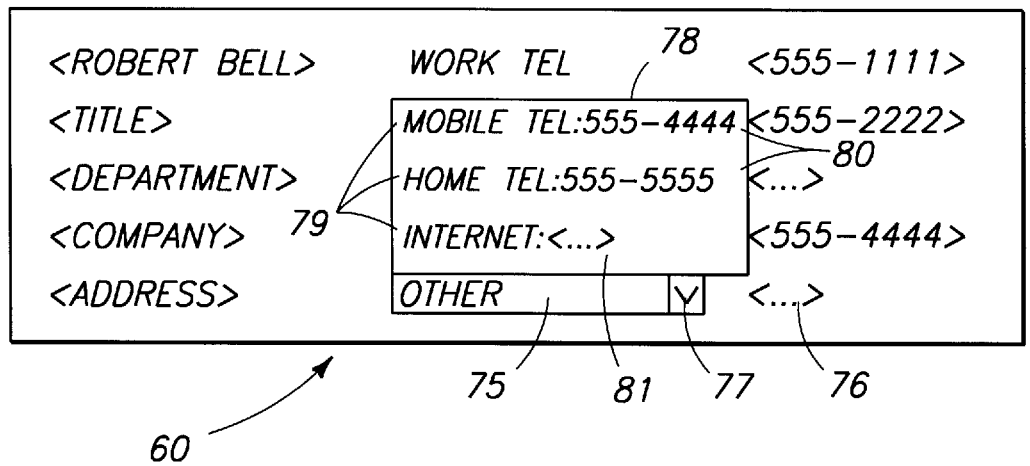
Figure 9:
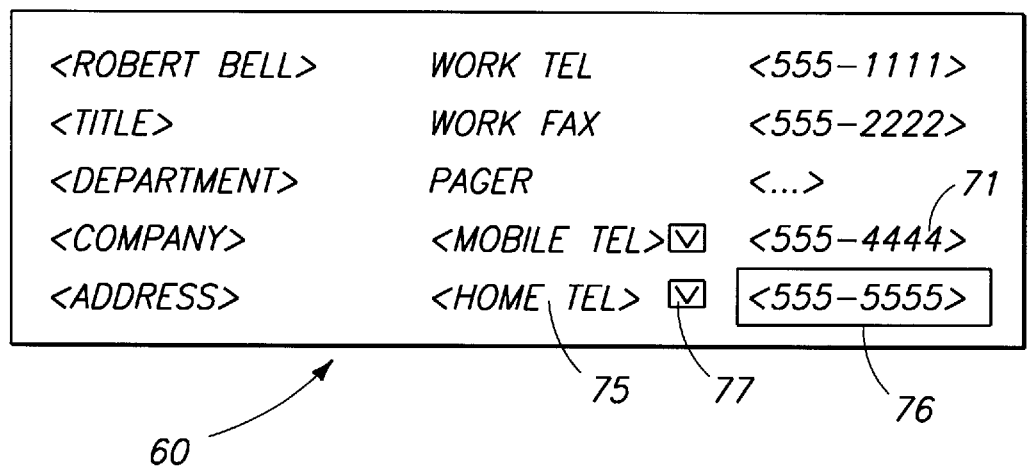

The process of selecting one of the field labels for variable field label 75 is shown in FIGS. 8–9. Label 75 initially reads "Other"(FIG. 6), indicating that the user has not yet made a selection for this label. No actual data is displayed or allowed to be entered in data entry field 76 when "Other" is the displayed field label.

As illustrated in FIG. 8, a pop-up list is associated with displayed field label 75. The pop-up list is selectively displayed in response to a user's selection. In the preferred embodiment, user interface 60 includes a control 77 associated with field label 75. The pop-up list is displayed or activated when the user selects control 77.

FIG. 8 shows user interface 60 after a pop-up list box 78, associated with field label 75, has been activated. Pop-up list box 78 contains a plurality of available field labels 79, corresponding to the fields of database record 90 of FIG. 7, that can be alternatively selected by the user. When an available field label is selected, it becomes the displayed field label 75. Each available field label 79 corresponds to a different stored record property or data field, as explained with reference to FIG. 7. When a particular field label is selected to be the displayed field label, data entry field 76 displays data for the corresponding property, and allows data to be entered or modified for the corresponding property. When the displayed variable field label 75 is subsequently changed by the user, data entry field 76 displays and allows editing of data for a different property, corresponding to the newly selected field label.

In addition to a listing of available field labels, pop-up list box 78 contains an indication of any existing values for the stored properties corresponding to the available field labels. More specifically, each available field label is followed by a textual representation 80 of any data that has already been entered for the corresponding property. For instance, the available field label "Home Tel" is followed by the actual data already contained in the "Home Tel" record property (555-5555). In the preferred embodiment, the available field labels are positioned within the pop-up list box adjacent their corresponding values. For those properties for which values have not been entered, the pop-up list box includes an empty indicator, as referenced by numeral 81 in FIG. 7, indicating that a value has not yet been entered.

FIG. 9 shows user interface 80 after "Home Tel" has been selected as the displayed field label. The user selects this label from list box 78 by touching it with the stylus or by using the keyboard. After the selection, data entry field 72 contains the data corresponding to the displayed field label, in this case the field labeled "Home Tel".

At any time, the user can re-activate the pop-up list box to again change variable field label 75. The same selections are available to the user, and the user can see the data previously entered for any of the available database fields or properties.

While the invention has thus far been described primarily in terms of structural or graphical features associated with a user display, the invention also includes methodological steps that are preferably performed by the data processor or other logic components of a portable data entry device. These steps include placing or displaying a displayed field label on a user display, and placing or displaying a data entry field on the user display in proximity to the displayed field label. The data entry field contains an indication of any existing value for a stored property corresponding to the displayed field label. The invention further includes a step of associating a pop-up list box with the displayed field label, containing a plurality of available field labels. The available field labels correspond respectively to different stored properties.

Further steps in accordance with the invention include selectively displaying the pop-up list box on the user display in response to a user's selection, and selecting one of the available field labels in the pop-up list box as the displayed field label in response to user input. The invention also includes a step of including in the pop-up list box an indication of any existing values for the stored properties corresponding to the available field labels. Such an indication clarifies to the user that the available field labels correspond respectively to different stored properties. Empty indicators are included in the pop-up list box, associated with any available field label having a corresponding stored property for which a value has not been entered.

Indicating the data, within the pop-up list box, for properties for which data has already been entered clarifies to users that the available field labels correspond respectively to different stored properties rather than just being alternative labels for the same property. It has been found that this scheme greatly reduces or even eliminates user confusion regarding this issue.

In compliance with the statute, the invention has been described in language more or less specific as to structural and methodological features. It is to be understood, however, that the invention is not limited to the specific features and steps described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A portable user interface comprising:

a user display having a display area that is too small to simultaneously display all of the individual properties of a data record in a way that is easily understandable by a user;

a plurality of displayed field labels on the user display;

a pop-up list box associated with a particular one of the displayed field labels, the pop-up list box being selectively overlaid on the displayed field labels in response to a user's selection;

the pop-up list box containing a plurality of available field labels that can be alternatively selected by the user as the displayed field label, wherein the field labels correspond respectively to different stored properties;

a data entry field corresponding to said particular one of the displayed field labels, the data entry field being displayed on the user display simultaneously with the plurality of displayed field labels, the data entry field being selectable by a user to enter a value for the stored property corresponding to the displayed field label;

the pop-up list box further containing an indication of any existing values for the stored properties corresponding to the available field labels, said indication clarifying to the user that the available field labels correspond respectively to different stored properties.

2. A user interface as recited in claim 1 wherein the pop-up list box includes an empty indicator associated with any available field label having a corresponding stored property for which a value has not been entered.

3. A user interface as recited in claim 1 wherein the respective available field labels are positioned within the pop-up list box adjacent the indications of existing values for the corresponding stored properties.

4. A portable data entry device, comprising:

a data processor;

data memory accessible by the data processor for storing data records, each data record including a plurality of individual stored properties;

a user display that is responsive to the data processor, the user display having a display area that is too small to simultaneously display all of the individual properties of a data record in a way that is easily understandable by a user;

the data processor being programmed to display individual stored properties of a data record by performing the following steps:

placing a displayed field label on the user display;

associating a pop-up list box with the displayed field label, the pop-up list box containing a plurality of available field labels, wherein the available field labels correspond respectively to different stored properties;

selectively overlaying the pop-up list box on the user display containing the displayed field label in response to a user's selection;

selecting one of the available field labels in the pop-up list box as the displayed field label in response to user input;

displaying a data entry field on the user display simultaneously with the displayed field label, the data entry field containing an indication of any existing value for the stored property corresponding to the displayed field label;

including in the pop-up list box an indication of any existing values for the stored properties corresponding to the available field labels, said indication clarifying to the user that the available field labels correspond respectively to different stored properties.

5. A portable data entry device as recited in claim 4 wherein the data processor is further programmed to perform a step of including in the pop-up list box an empty indicator associated with any available field label having a corresponding stored property for which a value has not been entered.

6. A portable data entry device as recited in claim 4 wherein the data processor is further programmed to perform a step of positioning the respective available field labels within the pop-up list box adjacent the indications of existing values for the corresponding stored properties.

7. A method of displaying stored data properties on a portable user interface, comprising the following steps:

placing a displayed field label on a user display, the user display having a display area that is too small to simultaneously display all of the individual properties of a data record in a way that is easily understandable by a user;

associating a pop-up list box with the displayed field label, the pop-up list box containing a plurality of available field labels, wherein the available field labels correspond respectively to different stored properties;

selectively overlaying the pop-up list box on the user display containing the displayed field label in response to a user's selection;

selecting one of the available field labels in the pop-up list box as the displayed field label in response to user input;

displaying a data entry field on the user display simultaneously with the plurality of displayed field labels in proximity to the displayed field label, the data entry field containing an indication of any existing value for the stored property corresponding to the displayed field label;

including in the pop-up list box an indication of any existing values for the stored properties corresponding to the available field labels, said indication clarifying to the user that the available field labels correspond respectively to different stored properties.

8. A method as recited in claim 7 and further comprising a step of including in the pop-up list box an empty indicator associated with any available field label having a corresponding stored property for which a value has not been entered.

9. A portable data entry device as recited in claim 7 and further comprising a step of positioning the respective available field labels within the pop-up list box adjacent the indications of existing values for the corresponding stored properties.

10. A computer-readable storage medium containing instructions that are executable by a computer to perform steps comprising:

placing a plurality of displayed field labels on a portable user display having a display area that is too small to simultaneously display all of the individual properties of a data record in a way that is easily understandable by a user;

associating a pop-up list box with a particular one of the displayed field labels, the pop-up list box containing a plurality of available field labels, wherein the available field labels correspond respectively to different stored properties;

selectively overlaying the pop-up list box on the user display containing the displayed field labels in response to a user's selection;

selecting one of the available field labels in the pop-up list box as the particular one of the displayed field labels in response to user input;

displaying the selected field label as the particular one of the displayed field labels;

displaying a data entry field on the user display simultaneously with the plurality of displayed field labels in proximity to the displayed field label, the data entry field containing an indication of any existing value for the stored property corresponding to the displayed field label;

including in the pop-up list box an indication of any existing values for the stored properties corresponding to the available field labels, said indication clarifying to the user that the available field labels correspond respectively to different stored properties.

11. A computer-readable storage medium as recited in claim 10, the instructions being executable to perform a further step of including in the pop-up list box an empty indicator associated with any available field label having a corresponding stored property for which a value has not been entered.

12. A computer-readable storage medium as recited in claim 10, the instructions being executable to perform a further step of positioning the respective available field labels within the pop-up list box adjacent the indications of existing values for the corresponding stored properties.

* * * * *